(12) United States Patent
Matsushima

(10) Patent No.: US 7,787,083 B2
(45) Date of Patent: Aug. 31, 2010

(54) LIQUID CRYSTAL DEVICE AND ELECTRONIC APPARATUS

(75) Inventor: Toshiharu Matsushima, Azumino (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 11/653,834

(22) Filed: Jan. 17, 2007

(65) Prior Publication Data
US 2007/0188685 A1   Aug. 16, 2007

(30) Foreign Application Priority Data
Feb. 14, 2006   (JP) .............................. 2006-036084

(51) Int. Cl.
*G02F 1/1335*   (2006.01)
(52) U.S. Cl. .................................... 349/117
(58) Field of Classification Search .................. 349/117
See application file for complete search history.

(56) References Cited

U.S. PATENT DOCUMENTS

| | | | |
|---|---|---|---|
| 6,307,608 B1 * | 10/2001 | Sakamoto | 349/119 |
| 6,636,286 B1 * | 10/2003 | Baek | 349/114 |
| 7,042,540 B2 | 5/2006 | Yano et al. | |
| 7,567,327 B2 | 7/2009 | Kawachi et al. | |
| 2003/0002002 A1 | 1/2003 | Kawachi et al. | |

FOREIGN PATENT DOCUMENTS

JP   A-2003-015155   1/2003
JP   A-2004-004642   1/2004

OTHER PUBLICATIONS

Park et al.; "13.5L: Late-News Paper: Super High Performance of the 20.8" Medical Monitor Using True Black Advanced FFS; SID 05 Digest; 13.5L; pp. 200-203, May 2005.

* cited by examiner

*Primary Examiner*—Jerry T Rahll
(74) *Attorney, Agent, or Firm*—K&L Gates LLP

(57) ABSTRACT

A liquid crystal device includes a first substrate having an alignment film; a second substrate disposed opposite the first substrate and having first and second electrodes and an alignment film; a liquid crystal layer disposed between the alignment films of the first and second substrates; a retardation film disposed on a side of the first substrate facing away from the liquid crystal layer; a first polarizer disposed on the side of the first substrate facing away from the liquid crystal layer; and a second polarizer disposed on a side of the second substrate facing away from the liquid crystal layer. The liquid crystal layer is aligned in a direction parallel to the first and second substrates by the alignment films and is driven by an electric field generated between the first and second electrodes. The slow axis of the retardation film is parallel to the transmission axis of the first or second polarizer and is parallel to the alignment direction of the liquid crystal layer. The Nz coefficient and the phase shift $\Delta nd$ (nm) of the retardation film fall within a range defined on a graph showing Nz coefficients and phase shifts $\Delta nd$ as points (Nz, $\Delta nd$) by linking point A1 (0.3, 68), point A2 (0.5, 175), point A3 (0.7, 215), point A4 (0.7, 332), point A5 (0.5, 365), and point A6 (0.3, 230). The Nz coefficient is defined by the following formula (1):

$$Nz = (nx - nz)/|nx - ny| \qquad (1).$$

10 Claims, 10 Drawing Sheets

LIQUID CRYSTAL DEVICE AND ELECTRONIC APPARATUS

BACKGROUND

1. Technical Field

The present invention relates to liquid crystal devices and electronic apparatuses.

2. Related Art

One of known types of liquid crystal displays applies an electric field to a liquid crystal layer in a direction parallel to a surface of a substrate (parallel electric field) to control the alignment of the liquid crystal. Known modes of operation for liquid crystal devices utilizing a parallel electric field include in-plane switching (IPS) and fringe-field switching (FFS), which differ in the type of electrodes used for applying an electric field to a liquid crystal. Viewing angle compensation of liquid crystal devices utilizing a parallel electric field has also been studied. An example of a liquid crystal panel is disclosed in S. H. Park et al., "Super High Performance of the 20.8", Medical Monitor Using True Black Advanced FFS", SID 05 DIGEST, 13.5L, pp. 200-203. This liquid crystal panel includes a C-plate (a uniaxial retardation film having an optical axis normal to a retardation layer) and an A-plate (a uniaxial retardation film having an optical axis parallel to a retardation layer) on the front side of the panel and another A-plate on the rear side of the panel.

Although the technique disclosed in the above document allows viewing angle compensation of a liquid crystal device utilizing a parallel electric field, the liquid crystal panel is undesirably costly and thick because optical compensation films are provided on the front and rear sides of the panel.

SUMMARY

An advantage of some aspects of the invention is that they provide a thinner, less costly liquid crystal device having a simple structure capable of excellent viewing angle compensation.

A liquid crystal device according to a first aspect of the invention includes a first substrate having an alignment film; a second substrate disposed opposite the first substrate and having first and second electrodes and an alignment film; a liquid crystal layer disposed between the alignment films of the first and second substrates; a retardation film disposed on a side of the first substrate facing away from the liquid crystal layer; a first polarizer disposed on the side of the first substrate facing away from the liquid crystal layer; and a second polarizer disposed on a side of the second substrate facing away from the liquid crystal layer. The liquid crystal layer is aligned in a direction parallel to the first and second substrates by the alignment films and is driven by an electric field generated between the first and second electrodes. The slow axis of the retardation film is parallel to the transmission axis of the first or second polarizer and is parallel to the alignment direction of the liquid crystal layer. The Nz coefficient and the phase shift $\Delta$nd (nm) of the retardation film fall within a range defined on a graph showing Nz coefficients and phase shifts $\Delta$nd as points (Nz, $\Delta$nd) by linking point A1 (0.3, 68), point A2 (0.5, 175), point A3 (0.7, 215), point A4 (0.7, 332), point A5 (0.5, 365), and point A6 (0.3, 230). The Nz coefficient is defined by the following formula (1):

$$Nz=(nx-nz)/|nx-ny| \qquad (1)$$

A liquid crystal device according to a second aspect of the invention includes a first substrate having an alignment film; a second substrate disposed opposite the first substrate and having first and second electrodes and an alignment film; a liquid crystal layer disposed between the alignment films of the first and second substrates; a retardation film disposed on a side of the first substrate facing away from the liquid crystal layer; a first polarizer disposed on the side of the first substrate facing away from the liquid crystal layer; and a second polarizer disposed on a side of the second substrate facing away from the liquid crystal layer. The liquid crystal layer is aligned in a direction parallel to the first and second substrates by the alignment films and is driven by an electric field generated between the first and second electrodes. The slow axis of the retardation film is parallel to the transmission axis of the first or second polarizer and is perpendicular to the alignment direction of the liquid crystal layer. The Nz coefficient and the phase shift $\Delta$nd (nm) of the retardation film fall within a range defined on a graph showing Nz coefficients and phase shifts $\Delta$nd as points (Nz, $\Delta$nd) by linking point B1 (0.5, 175), point B2 (0.7, 209), point B3 (0.7, 337), and point B4 (0.5, 363). The Nz coefficient is defined by the following formula (1):

$$Nz=(nx-nz)/|nx-ny| \qquad (1)$$

A liquid crystal device according to a third aspect of the invention includes a first substrate having an alignment film; a second substrate disposed opposite the first substrate and having first and second electrodes and an alignment film; a liquid crystal layer disposed between the alignment films of the first and second substrates; a first retardation film disposed on a side of the first substrate facing away from the liquid crystal layer; a second retardation film disposed on the side of the first substrate facing away from the liquid crystal layer; a first polarizer disposed on the side of the first substrate facing away from the liquid crystal layer; a third retardation film disposed on a side of the second substrate facing away from the liquid crystal layer; and a second polarizer disposed on the side of the second substrate facing away from the liquid crystal layer. The liquid crystal layer is aligned in a direction parallel to the first and second substrates by the alignment films and is driven by an electric field generated between the first and second electrodes. The third retardation film is equivalent to the second retardation film. The slow axis of the first retardation film is parallel to the transmission axis of the first or second polarizer and is parallel to the alignment direction of the liquid crystal layer. The Nz coefficient and the phase shift $\Delta$nd (nm) of the first retardation film fall within a range defined on a graph showing Nz coefficients and phase shifts $\Delta$nd as points (Nz, $\Delta$nd) by linking point C1 (0, 68), point C2 (0.3, 71), point C3 (0.5, 104), point C4 (0.5, 184), point C5 (0.3, 227), and point C6 (0, 162). The Nz coefficient is defined by the following formula (1):

$$Nz=(nx-nz)/|nx-ny| \qquad (1)$$

A liquid crystal device according to a fourth aspect of the invention includes a first substrate having an alignment film; a second substrate disposed opposite the first substrate and having first and second electrodes and an alignment film; a liquid crystal layer disposed between the alignment films of the first and second substrates; a first retardation film disposed on a side of the first substrate facing away from the liquid crystal layer; a second retardation film disposed on the side of the first substrate facing away from the liquid crystal layer; a first polarizer disposed on the side of the first substrate facing away from the liquid crystal layer; a third retardation film disposed on a side of the second substrate facing away from the liquid crystal layer; and a second polarizer disposed on the side of the second substrate facing away from the liquid crystal layer. The liquid crystal layer is aligned in a direction parallel to the first and second substrates by the alignment films and is driven by an electric field generated between the first and second electrodes. The third retardation film is equivalent to the second retardation film. The slow axis of the first retardation film is parallel to the transmission axis of the first or second polarizer and is perpendicular to the alignment direction of the liquid crystal layer. The Nz coefficient and the phase shift Δnd (nm) of the first retardation film fall within a range defined on a graph showing Nz coefficients and phase shifts Δnd as points (Nz, Δnd) by linking point D1 (0.5, 386), point D2 (0.7, 322), point D3 (1.0, 400), point D4 (0.7, 450), and point D5 (0.5, 400). The Nz coefficient is defined by the following formula (1):

$$Nz=(nx-nz)/|nx-ny| \quad (1)$$

These liquid crystal devices can achieve an excellent viewing angle compensation effect only with a single retardation film having an Nz coefficient and a phase shift Δnd within the ranges described above. The liquid crystal devices can thus achieve reductions in thickness and cost with a simple structure having an excellent viewing angle compensation effect in comparison with known liquid crystal devices requiring a plurality of retardation films.

In the liquid crystal device according to the first aspect of the invention, each subpixel region may include a reflective display region and a transmissive display region. That is, a transflective liquid crystal device can be provided.

In the transflective liquid crystal device, preferably, the retardation film is disposed on a display side of the liquid crystal device to achieve a viewing angle compensation effect for reflective display.

An electronic apparatus may include the liquid crystal device according to the first aspect of the invention. This liquid crystal device can be used as a thin, low-cost display unit with high contrast and wide viewing angle.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
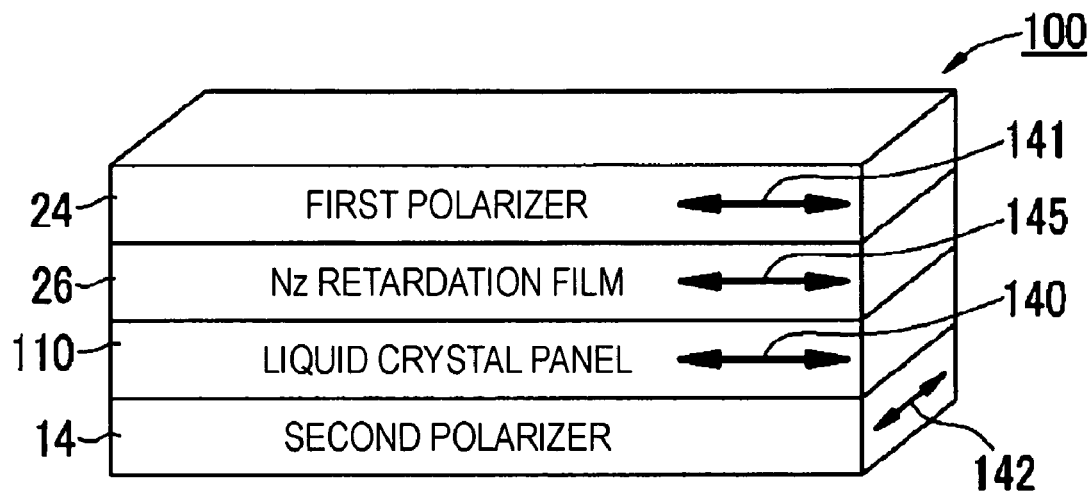
FIG. 1 is a schematic diagram of a liquid crystal device according to a first embodiment of the invention.

A first embodiment of the invention will be described with reference to the drawings. FIG. 1 is a schematic diagram of the sectional structure of a liquid crystal device 100 according to this embodiment.

In FIG. 1, the liquid crystal device 100 includes a liquid crystal panel 110, a retardation film 26 disposed on the front side of the liquid crystal panel 110 (on the upper side in FIG. 1), a first polarizer 24 disposed on the retardation film 26, and a second polarizer 14 disposed on the rear side of the liquid crystal panel 110 (on the lower side in FIG. 1).

The liquid crystal panel 110 includes opposing first and second substrates and a liquid crystal layer held therebetween. Alignment films are formed on surfaces of the first and second substrates in contact with the liquid crystal layer. These alignment films are subjected to an alignment treatment such as rubbing. The alignment directions of the alignment films of the first and second substrates are parallel to each other. The alignment films thus initially align the liquid crystal in a direction parallel to the surfaces of the substrates.

The liquid crystal panel 110 utilizes a parallel electric field, as typified by IPS and FFS. An electric field generated between first and second electrodes disposed on a surface of the second substrate opposite the liquid crystal layer is applied to the liquid crystal layer to control the alignment thereof, thereby displaying an image.

In the optical axis configuration of the liquid crystal device 100 according to this embodiment shown in FIG. 1, the transmission axis 141 of the first polarizer 24 is perpendicular to the transmission axis 142 of the second polarizer 14. The slow axis 145 of the retardation film 26 is parallel to the transmission axis 141 of the first polarizer 24 and is also parallel to the alignment direction 140 of the liquid crystal held in the liquid crystal panel 110 (the direction of the alignment treatment of the alignment films).

Figure 2:
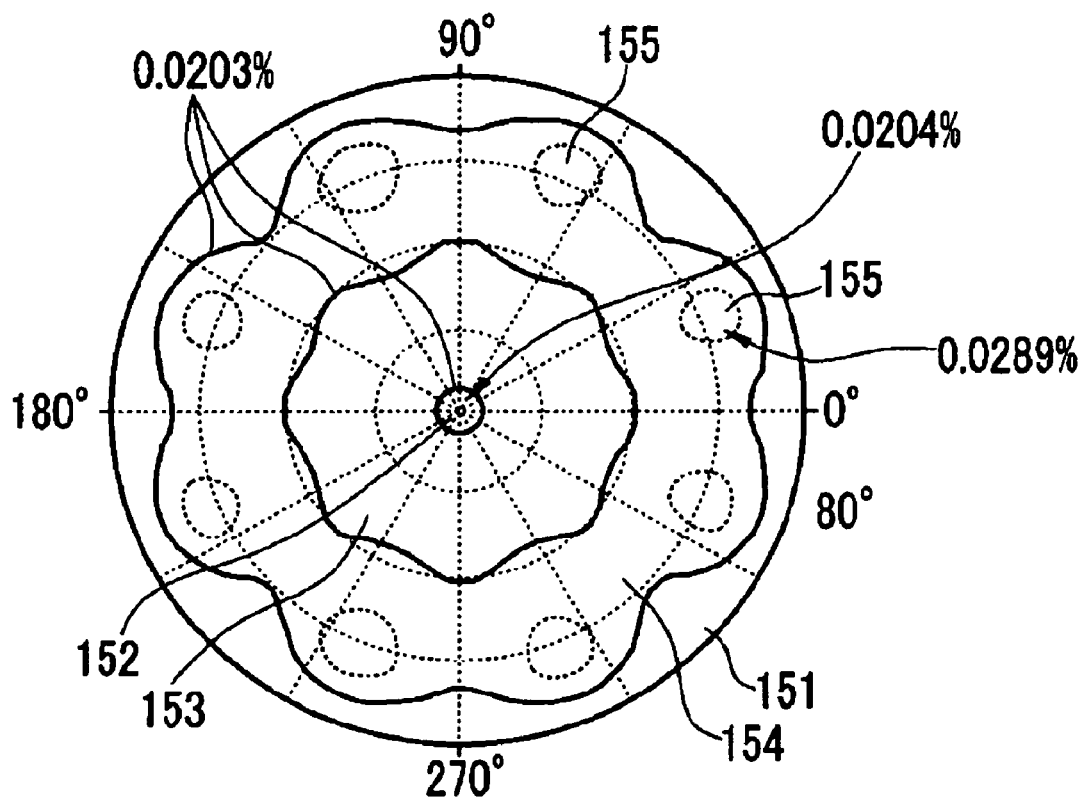
FIG. 2 is a graph showing the viewing-angle characteristics of the liquid crystal device according to the first embodiment.

FIG. 2 is a graph showing the viewing-angle characteristics (80° cone) of the liquid crystal device 100 having the schematic structure shown in FIG. 1 for black display. The liquid crystal layer of the liquid crystal panel 110 of the liquid crystal device 100 causes a phase shift Δnd of 350 nm. The retardation film 26 causes a phase shift Δnd of 273 nm and has an Nz coefficient of 0.5. The Nz coefficient of the retardation film 26 is represented by the following formula (1):

$$Nz=(nx-nz)/|nx-ny| \quad (1)$$

where nx, ny, and nz are the refractive indices of the retardation film 26 in three dimensions: nx is the refractive index of the retardation film 26 in the slow-axis direction; ny is the refractive index of the retardation film 26 in a direction parallel to the surfaces of the substrates and perpendicular to the slow axis 145; and nz is the refractive index of the retardation film 26 in the thickness direction.

In the graph of FIG. 2, the luminance of the liquid crystal device 100 (leaking light) is lowest in a region 151 and increases in the order of a region 152 (front), a region 153, a region 154, and regions 155. Curves drawn along the boundaries between the regions 152 and 153, the regions 153 and 154, and the regions 154 and 151 are isoluminance curves of 0.0203%. The front luminance (the luminance at the central position) is 0.0204%. The regions 155 have a luminance of 0.0289%, which are the brightest regions (where the largest amount of light leaks).

Figure 15:
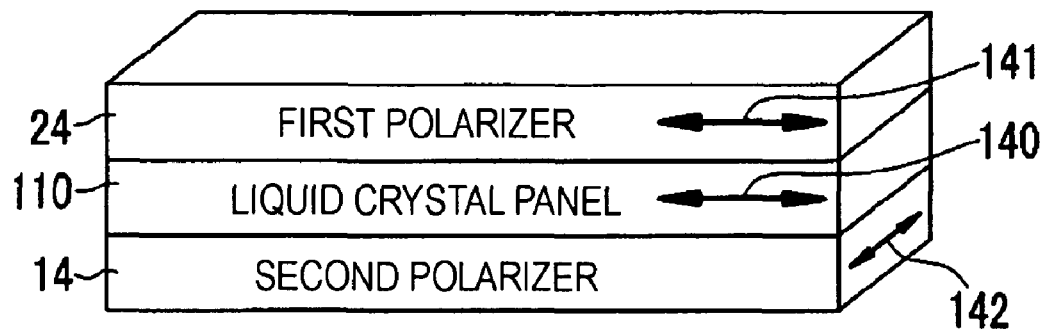
FIG. 15 is a schematic diagram of a liquid crystal device for comparison.
Figure 16:
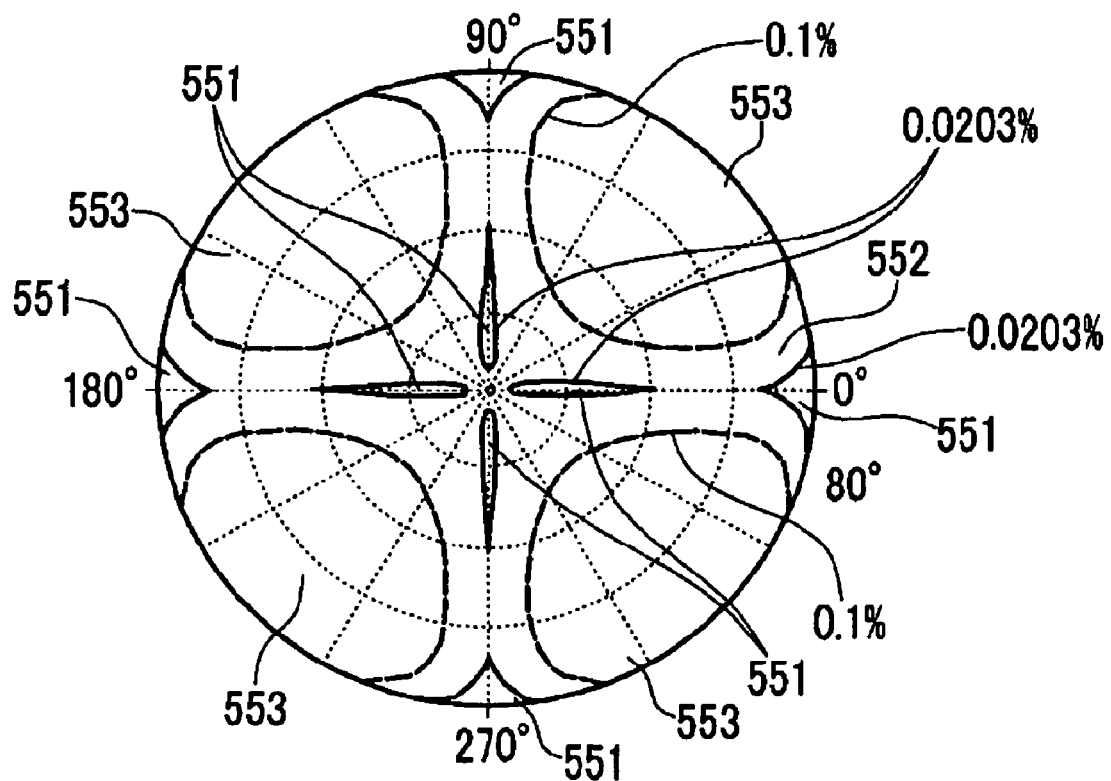
FIG. 16 is a graph showing the viewing-angle characteristics of the liquid crystal device.

FIG. 15 is a schematic diagram of a liquid crystal device that is similar to the liquid crystal device 100 according to this embodiment but does not include the retardation film 26. The liquid crystal device shown in FIG. 15 includes a first polarizer 24, a second polarizer 14, and a liquid crystal panel 110 held therebetween. FIG. 16 is a graph showing the viewing-angle characteristics of the liquid crystal device shown in FIG. 15. As in the first embodiment of the invention, the liquid crystal layer of the liquid crystal panel 110 causes a phase shift $\Delta$nd of 350 nm.

In FIG. 16, a cross-shaped region 552 defined by isoluminance curves of 0.1% and extending in the 0°, 90°, 180°, and 270° directions has a relatively low luminance. Regions 551 defined inside the cross-shaped region 552 by isoluminance curves of 0.0203% have the lowest luminance. Regions 553 extending in the 45°, 135°, 225°, and 315° directions have high luminance (a large amount of leaking light).

A comparison of the graphs of FIGS. 2 and 16 reveals that the liquid crystal device 100 according to this embodiment achieves excellent compensation for black display at every azimuth. The viewing angle compensation effect of the liquid crystal device 100 according to this embodiment originates mainly from the function of the retardation film 26. In particular, the use of a single retardation film having an appropriate combination of Nz coefficient and phase shift $\Delta$nd provides an outstanding viewing angle compensation effect. A considerable viewing angle compensation effect can be provided even if the Nz coefficient and the phase shift $\Delta$nd deviate from the values specified above to a certain extent. The effect tends to decline as the Nz coefficient and the phase shift $\Delta$nd deviate from the optimum values.

Figure 3:
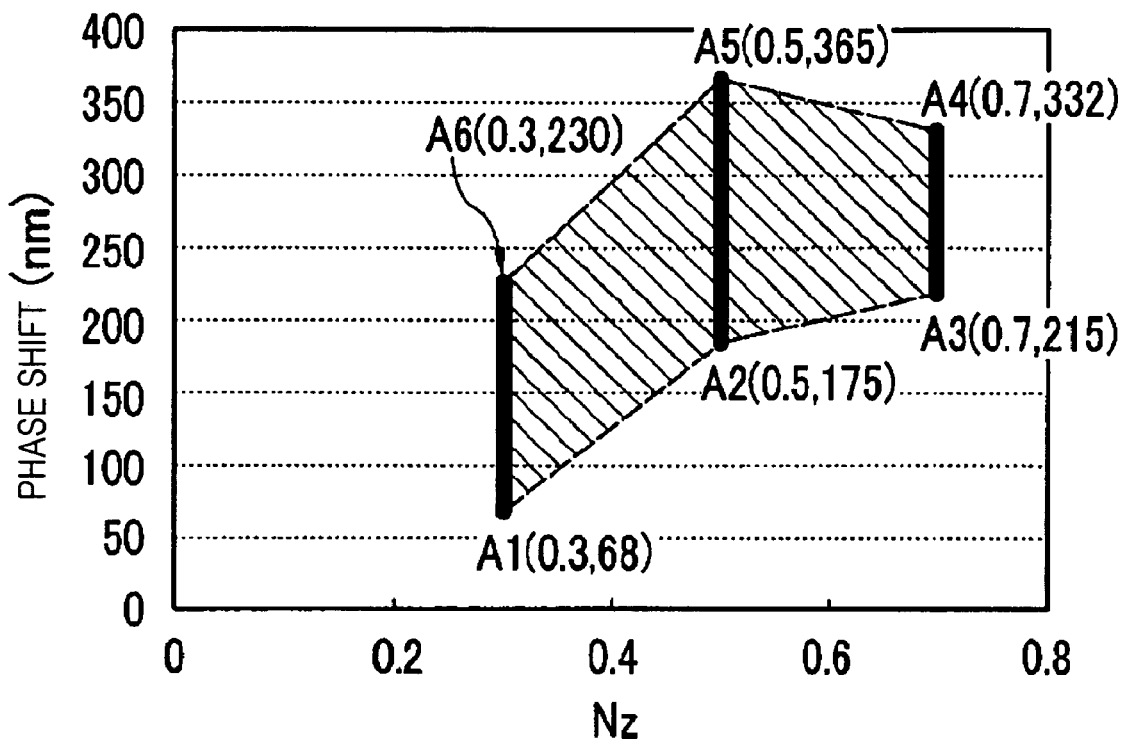
FIG. 3 is a graph showing a range where an appropriate viewing angle compensation effect can be achieved in the first embodiment.

FIG. 3 is a graph showing combinations of the Nz coefficient and phase shift $\Delta$nd of the retardation film 26 which provide a luminance less than 0.1% at a polar angle of 60° (the region where the largest amount of light leaks in FIG. 2). A luminance less than 0.1% can be achieved at a polar angle of 60° by selecting a combination of Nz coefficient and phase shift $\Delta$nd within a region (hatched region) defined by linking points plotted counterclockwise from near the point of origin (0, 0) on the graph of FIG. 3, that is, point A1 (0.3, 68), point A2 (0.5, 175), point A3 (0.7, 215), point A4 (0.7, 332), point A5 (0.5, 365), and point A6 (0.3, 230).

Second Embodiment

Figure 4:
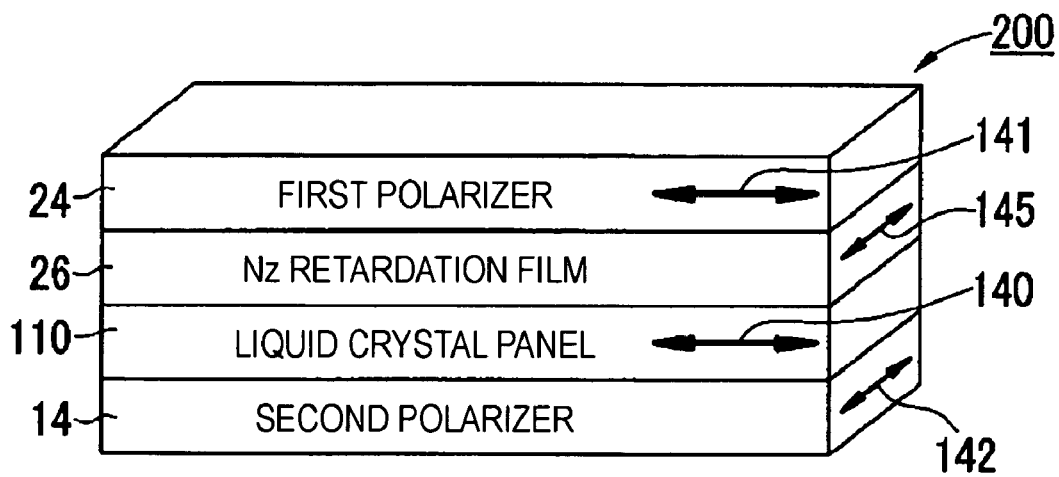
FIG. 4 is a schematic diagram of a liquid crystal device according to a second embodiment of the invention.

A second embodiment of the invention will be described with reference to the drawings. FIG. 4 is a schematic diagram of the sectional structure of a liquid crystal device 200 according to this embodiment.

In FIG. 4, the liquid crystal device 200 includes a liquid crystal panel 110, a retardation film 26 disposed on the front side of the liquid crystal panel 110 (on the upper side in FIG. 4), a first polarizer 24 disposed on the retardation film 26, and a second polarizer 14 disposed on the rear side of the liquid crystal panel 110 (on the lower side in FIG. 4). The liquid crystal panel 110 has the same structure as in the first embodiment and thus will not be described herein.

In the optical axis configuration of the liquid crystal device 200 according to this embodiment shown in FIG. 4, the transmission axis 141 of the first polarizer 24 is perpendicular to the transmission axis 142 of the second polarizer 14. The slow axis 145 of the retardation film 26 is perpendicular to the transmission axis 141 of the first polarizer 24 and is also perpendicular to the alignment direction 140 of the liquid crystal panel 110 (the alignment direction of the alignment films).

Figure 5:
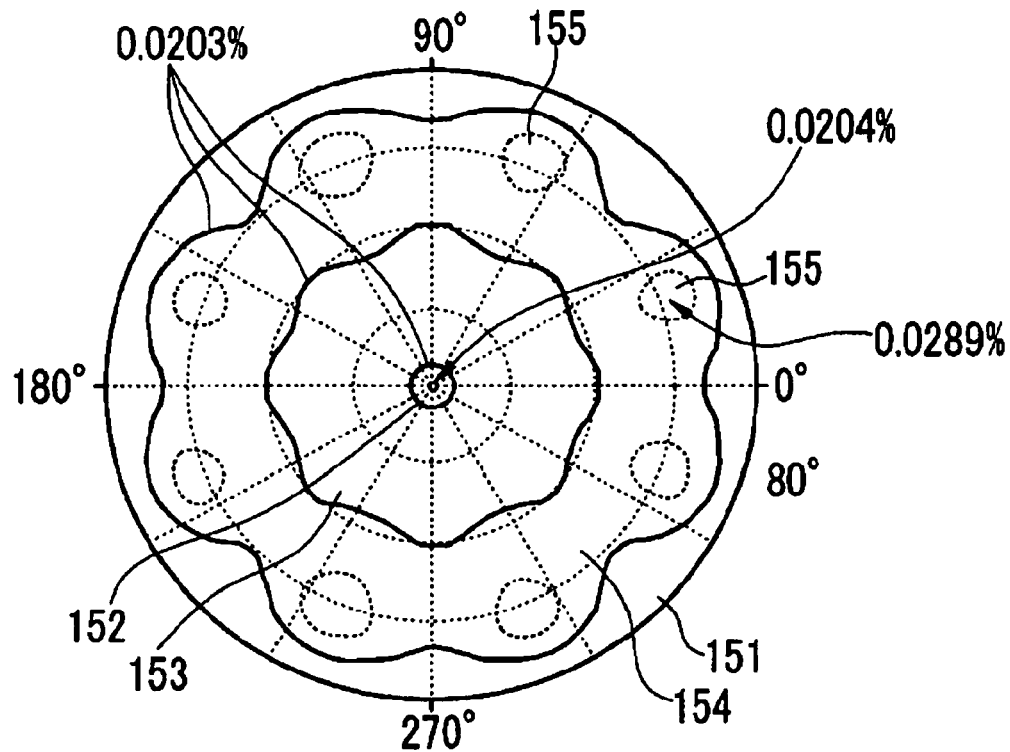
FIG. 5 is a graph showing the viewing-angle characteristics of the liquid crystal device according to the second embodiment.

FIG. 5 is a graph showing the viewing-angle characteristics (80° cone) of the liquid crystal device 200 having the schematic structure shown in FIG. 4 for black display. The liquid crystal layer of the liquid crystal panel 110 of the liquid crystal device 200 causes a phase shift $\Delta$nd of 350 nm. The retardation film 26 causes a phase shift $\Delta$nd of 271 nm and has an Nz coefficient of 0.5. The Nz coefficient of the retardation film 26 is represented by the formula (1) described above.

In the graph of FIG. 5, the luminance of the liquid crystal device 200 (leaking light) is lowest in a region 151 and increases in the order of a region 152 (front), a region 153, a region 154, and regions 155. Curves drawn along the boundaries between the regions 152 and 153, the regions 153 and 154, and the regions 154 and 151 are isoluminance curves of 0.0203%. The front luminance (the luminance at the central position) is 0.0204%. The regions 155 have a luminance of 0.0289%, which are the brightest regions (where the largest amount of light leaks).

A comparison of the graphs of FIGS. 5 and 16 reveals that the liquid crystal device 200 according to this embodiment achieves excellent compensation for black display at every azimuth, although the effect is slightly smaller than that provided by the liquid crystal device 100 according to the first embodiment. The viewing angle compensation effect of the liquid crystal device 200 according to this embodiment originates mainly from the function of the retardation film 26. In particular, the use of a single retardation film having an appropriate combination of Nz coefficient and phase shift $\Delta$nd provides an outstanding viewing angle compensation effect.

Figure 6:
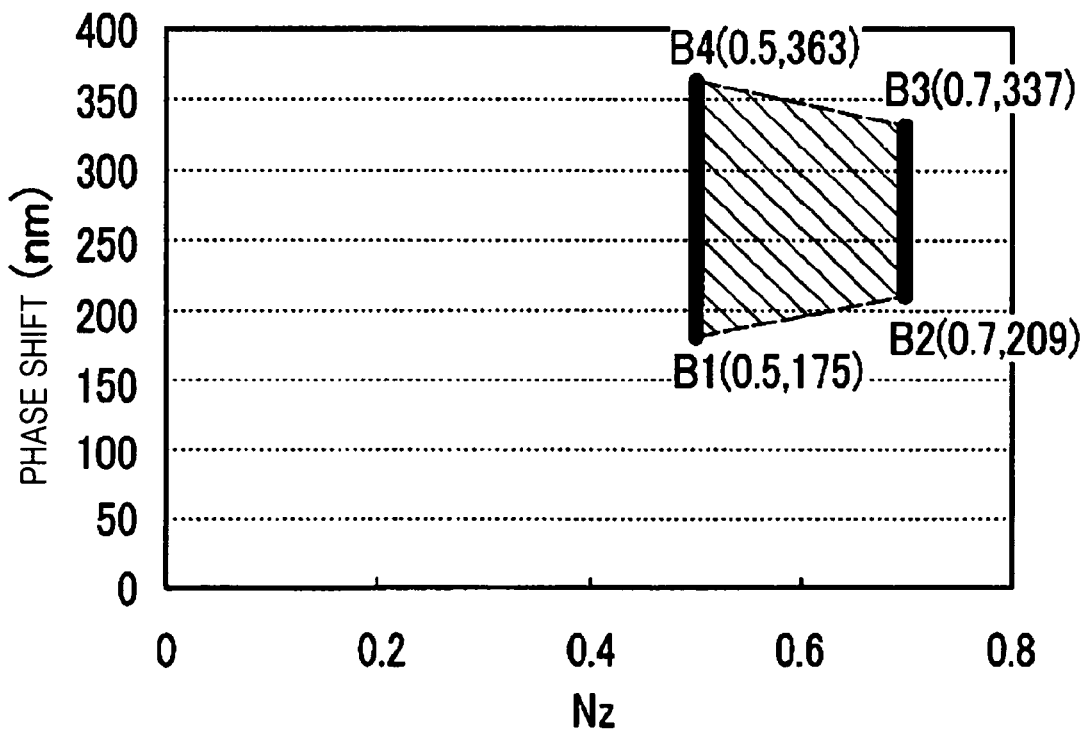
FIG. 6 is a graph showing a range where an appropriate viewing angle compensation effect can be achieved in the second embodiment.

FIG. 6 is a graph showing combinations of the Nz coefficient and phase shift $\Delta$nd of the retardation film 26 which provide a luminance less than 0.1% at a polar angle of 60° (the region where the largest amount of light leaks in FIG. 5). A luminance less than 0.1% can be achieved at a polar angle of 60° by selecting a combination of Nz coefficient and phase shift $\Delta$nd within a region (hatched region) defined by linking points plotted counterclockwise from near the point of origin (0, 0) on the graph of FIG. 6, that is, point B1 (0.5, 175), point B2 (0.7, 209), point B3 (0.7, 337), and point B4 (0.5, 363). As shown in FIG. 6, the liquid crystal device 200, in which the slow axis 145 of the retardation film 26 is perpendicular to the alignment direction 140 of the liquid crystal panel 110, has a narrower range of combinations of Nz coefficient and phase shift $\Delta$nd than that of the liquid crystal device 100 shown in FIG. 3.

Third Embodiment

Figure 7:
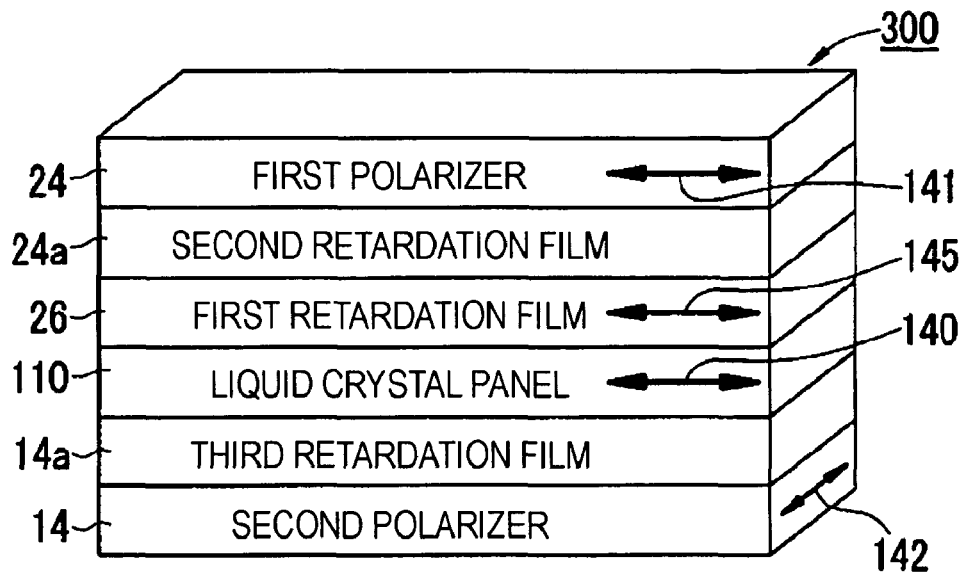
FIG. 7 is a schematic diagram of a liquid crystal device according to a third embodiment of the invention.

A third embodiment of the invention will be described with reference to the drawings. FIG. 7 is a schematic diagram of the sectional structure of a liquid crystal device 300 according to this embodiment.

In FIG. 7, the liquid crystal device 300 includes a liquid crystal panel 110, a first retardation film 26 disposed on the front side of the liquid crystal panel 110 (on the upper side in FIG. 7), a second retardation film 24a disposed on the first retardation film 26, a first polarizer 24, a third retardation film 14a disposed on the rear side of the liquid crystal panel 110 (on the lower side in FIG. 7), and a second polarizer 14.

A typical polarizer is composed of a polarizing layer, such as a polyvinyl alcohol (PVA) film, formed on a substrate, such as triacetyl cellulose (TAC), which causes a phase shift. In this embodiment, the second retardation film 24a and the third retardation film 14a are used as equivalents of substrates of polarizers in expectation of production of liquid crystal devices including polarizers composed of a polarizing layer formed on a substrate. The liquid crystal panel 110 has the same structure as in the first embodiment and thus will not be described herein.

In the optical axis configuration of the liquid crystal device 300 according to this embodiment shown in FIG. 7, the transmission axis 141 of the first polarizer 24 is perpendicular to the transmission axis 142 of the second polarizer 14. The slow axis 145 of the first retardation film 26 is parallel to the transmission axis 141 of the first polarizer 24 and is also parallel to the alignment direction 140 of the liquid crystal panel 110 (the alignment direction of the alignment films).

Figure 8:
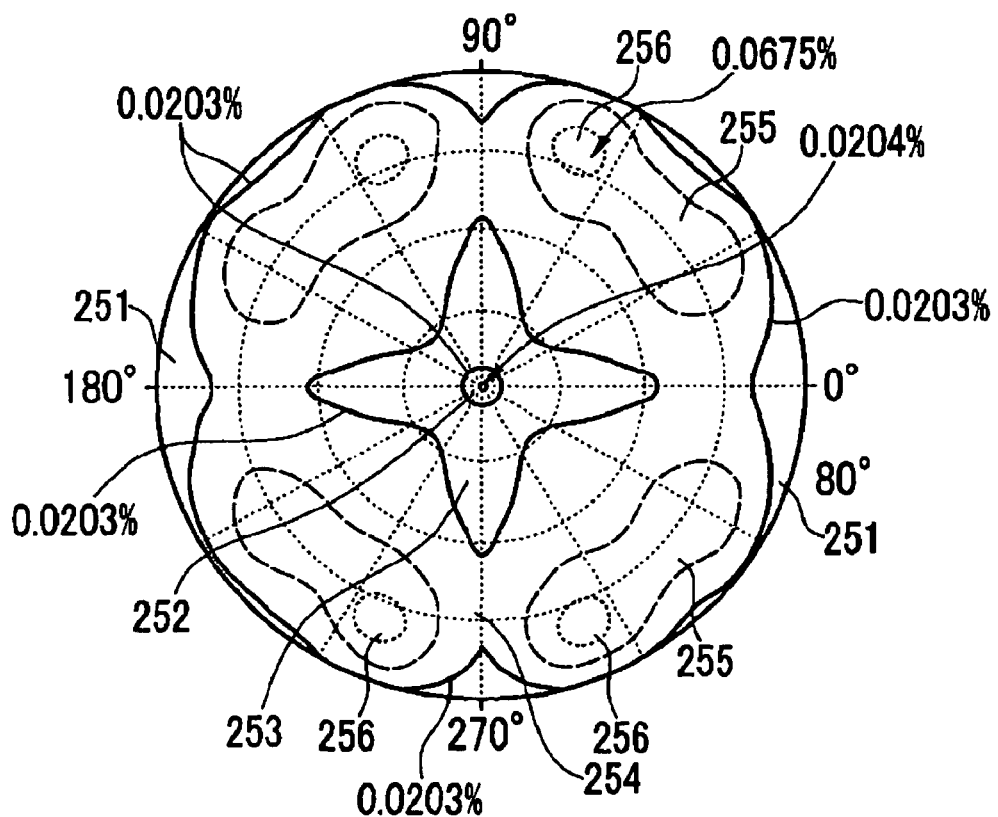
FIG. 8 is a graph showing the viewing-angle characteristics of the liquid crystal device according to the third embodiment.

FIG. 8 is a graph showing the viewing-angle characteristics (80° cone) of the liquid crystal device 300 having the schematic structure shown in FIG. 7 for black display. The liquid crystal layer of the liquid crystal panel 110 of the liquid crystal device 300 causes a phase shift $\Delta$nd of 350 nm. The first retardation film 26 causes a phase shift $\Delta$nd of 150 nm and has an Nz coefficient of 0.3. The Nz coefficient of the first retardation film 26 is represented by the formula (1) described above. The second retardation film 24a and the third retardation film 14a, which serve as substrates of the polarizers 24 and 14, respectively, are equivalent to negative C-plates that cause a phase shift $\Delta$nd of 40 nm.

In the graph of FIG. 8, the luminance of the liquid crystal device 300 (leaking light) is lowest in a region 251 and increases in the order of a region 252 (front), a region 253, a region 254, regions 255, and regions 256. Curves drawn along the boundaries between the regions 252 and 253, the regions 253 and 254, and the regions 254 and 251 are isoluminance curves of 0.0203%. The regions 255, as defined by the dashed lines, exhibit a significant increase in luminance (an increase in the amount of leaking light). The regions 256 inside the regions 255 have a still higher luminance. In this embodiment, the brightest regions 256 (where the largest amount of light leaks) have a luminance of 0.0675%. Thus, the substrates that cause a phase shift (the second retardation film 24a and the third retardation film 14a) decrease the viewing angle compensation function of the first retardation film 26. Nevertheless, the regions defined by the isoluminance curves of 0.0203% in the polar angle range of 20° to 40° are significantly larger than those for the structure shown in FIG. 15, which does not include the first retardation film 26. These results demonstrate the viewing angle compensation function of the first retardation film 26.

In the third embodiment, the retardation film 26 is disposed between the liquid crystal panel 110 and the first polarizer 24. The retardation film 26 may also be disposed between the liquid crystal panel 110 and the second polarizer 14 with the same optical axis configuration as in the case where the retardation film 26 is disposed between the liquid crystal panel 110 and the first polarizer 24.

Figure 9:
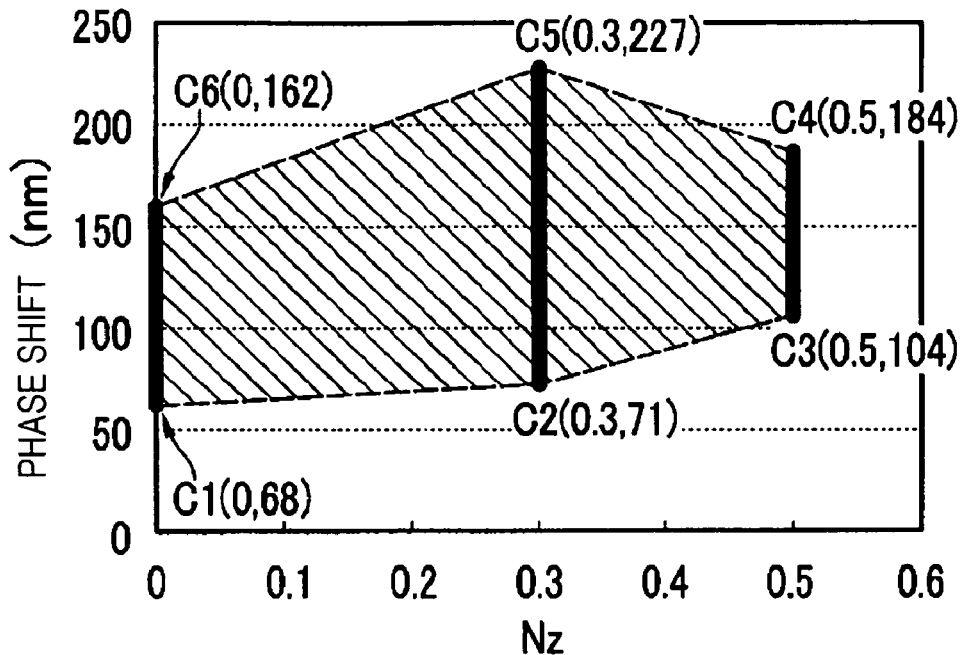
FIG. 9 is a graph showing a range where an appropriate viewing angle compensation effect can be achieved in the third embodiment.

FIG. 9 is a graph showing combinations of the Nz coefficient and phase shift $\Delta$nd of the retardation film 26 which provide a luminance less than 0.1% at a polar angle of 60° (the region where the largest amount of light leaks in FIG. 8). A luminance less than 0.1% can be achieved at a polar angle of 60° by selecting a combination of Nz coefficient and phase shift $\Delta$nd within a region (hatched region) defined by linking points plotted counterclockwise from near the point of origin (0, 0) on the graph of FIG. 9, that is, point C1 (0, 68), point C2 (0.3, 71), point C3 (0.5, 104), point C4 (0.5, 184), point C5 (0.3, 227), and point C6 (0, 162). As described above, the polarizers 24 and 14 of the liquid crystal device 300 are supported by the substrates that cause a phase shift, namely, the second retardation film 24a and the third retardation film 14a, respectively. Accordingly, as shown in FIG. 9, the liquid crystal device 300 has a narrower range of combinations of Nz coefficient and phase shift $\Delta$nd than that of the liquid crystal device 100 shown in FIG. 3, and the range of combinations is shifted toward lower Nz coefficients and smaller phase shifts $\Delta$nd.

Fourth Embodiment

A fourth embodiment of the invention will be described with reference to the drawings. A liquid crystal device according to this embodiment is constructed by providing retardation films similar to the second retardation film 24a and the third retardation film 14a according to the third embodiment in the liquid crystal device 200 according to the second embodiment. In other words, the liquid crystal device according to the fourth embodiment has the same structure as the liquid crystal device 300 according to the third embodiment but is constructed such that the slow axis 145 of the first retardation film 26 is perpendicular to the transmission axis 141 of the first polarizer 24 and the alignment direction 140 of the liquid crystal panel 110. The liquid crystal device according to the fourth embodiment will be described with reference to the structure of the liquid crystal device 300 shown in FIG. 7.

Figure 10:
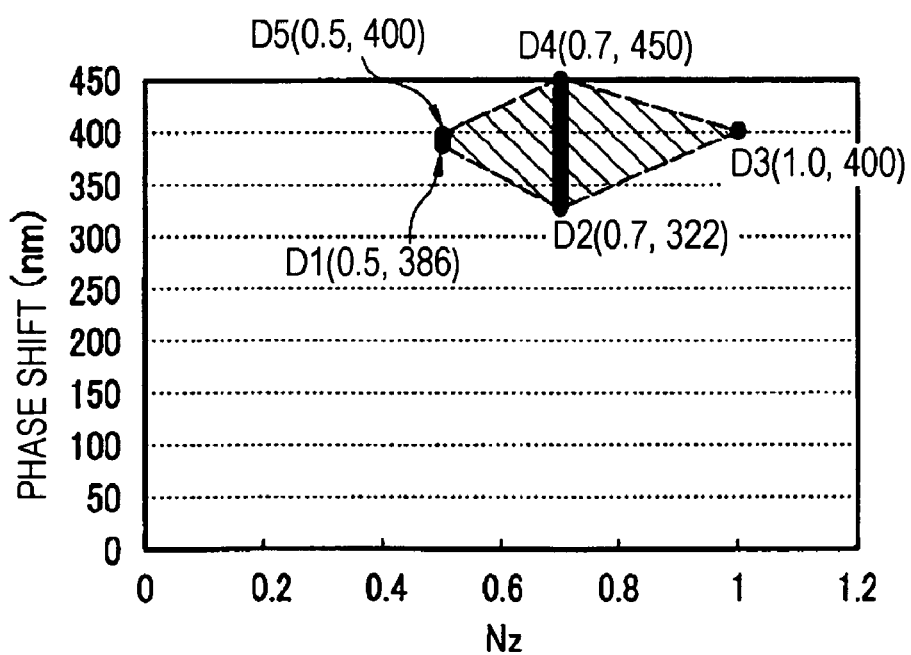
FIG. 10 is a graph showing a range where an appropriate viewing angle compensation effect can be achieved in a fourth embodiment of the invention.

FIG. 10 is a graph showing combinations of phase shifts $\Delta$nd and Nz coefficients for the liquid crystal device according to this embodiment. The liquid crystal layer of the liquid crystal panel 110 of the liquid crystal device according to this embodiment causes a phase shift $\Delta$nd of 350 nm. The first retardation film 26 causes a phase shift $\Delta$nd of 400 nm and has an Nz coefficient of 0.7. The Nz coefficient of the first retardation film 26 is represented by the formula (1) described above. The second retardation film 24a and the third retardation film 14a, which serve as substrates of the polarizers 24 and 14, respectively, are equivalent to negative C-plates that cause a phase shift $\Delta$nd of 40 nm.

In FIG. 10, a luminance less than 0.1% can be achieved at a polar angle of 60° by selecting a combination of Nz coefficient and phase shift $\Delta$nd within a region (hatched region) defined by linking points plotted counterclockwise from near the point of origin (0, 0) on the graph of FIG. 10, that is, point D1 (0.5, 386), point D2 (0.7, 322), point D3 (1.0, 400), point D4 (0.7, 450), and point D5 (0.5, 400). As described above, the polarizers 24 and 14 of the liquid crystal device according to this embodiment are supported by the substrates that cause a phase shift, namely, the second retardation film 24a and the third retardation film 14a, and the slow axis 145 of the first retardation film 26 is perpendicular to the transmission axis 141 of the first polarizer 24 and the alignment direction 140 of the liquid crystal panel 110. As shown in FIG. 10, accordingly, the liquid crystal device according to this embodiment has a narrower range of combinations of Nz coefficient and phase shift $\Delta$nd than that of the liquid crystal device 300 shown in FIG. 9, and the range of combinations is shifted toward higher Nz coefficients and larger phase shifts Δnd in comparison with that of the liquid crystal device 100 shown in FIG. 3. Nevertheless, regions defined by isoluminance curves of 0.0203% in the polar angle range of 20° to 40° are significantly larger than those for the structure shown in FIG. 15, which does not include the first retardation film 26. These results demonstrate the viewing angle compensation function of the first retardation film 26.

In the fourth embodiment, the retardation film 26 is disposed between the liquid crystal panel 110 and the first polarizer 24. The retardation film 26 may also be disposed between the liquid crystal panel 110 and the second polarizer 14 with the same optical axis configuration as in the case where the retardation film 26 is disposed between the liquid crystal panel 110 and the first polarizer 24.

Detailed Structure of Liquid Crystal Device

An example of the structure of the liquid crystal device 100 according to the first embodiment will be described with reference to the drawings. The liquid crystal device 100 of this example is a thin-film-transistor (TFT) active-matrix color liquid crystal device utilizing a parallel electric field and having an FFS-mode electrode configuration. The liquid crystal device 100 includes a color filter on the first substrate, and each pixel includes three subpixels that output red (R) light, green (G) light, and blue (B) light. Accordingly, the minimum unit of display region is referred to as a "subpixel region", and a region including a set of subpixels (R, G, and B) is referred to as a "pixel region".

Figure 11:
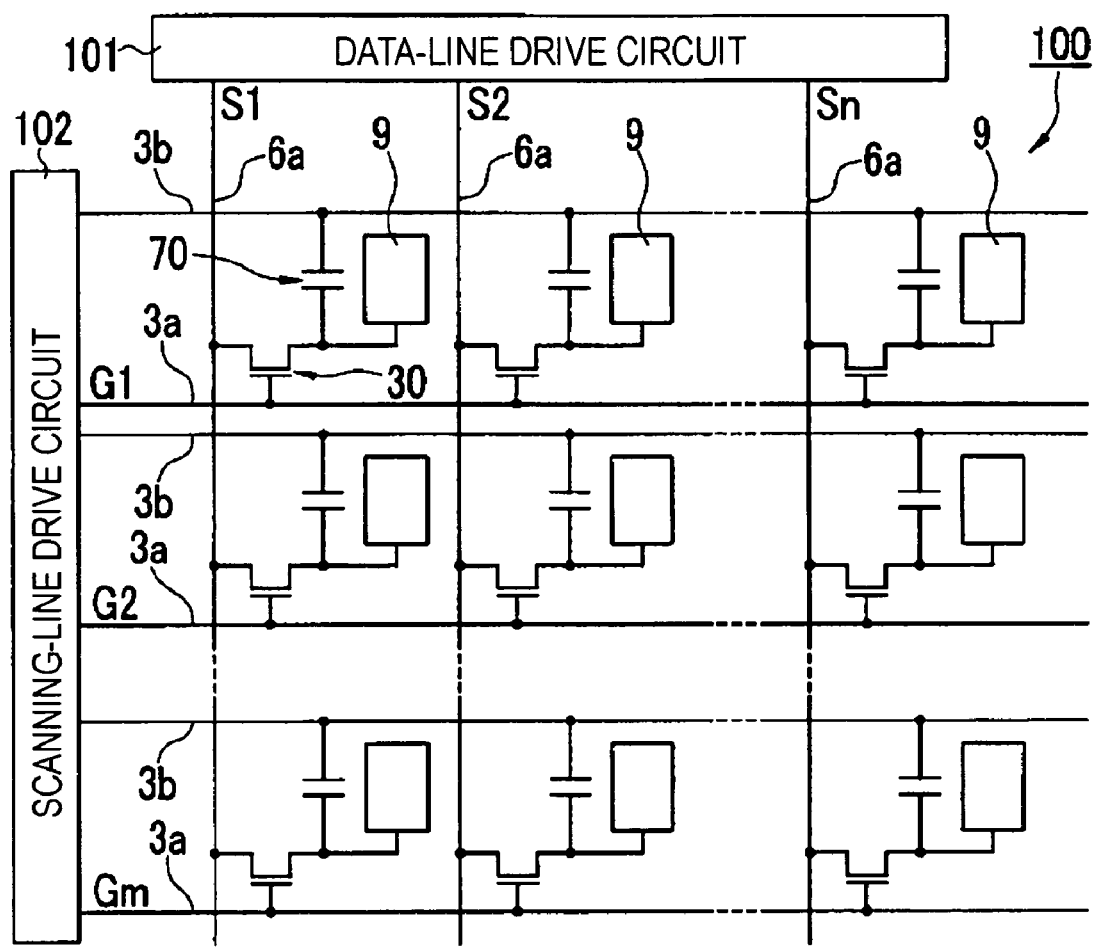
FIG. 11 is an equivalent circuit diagram of an example of a liquid crystal device according to an embodiment of the invention.
Figure 12:
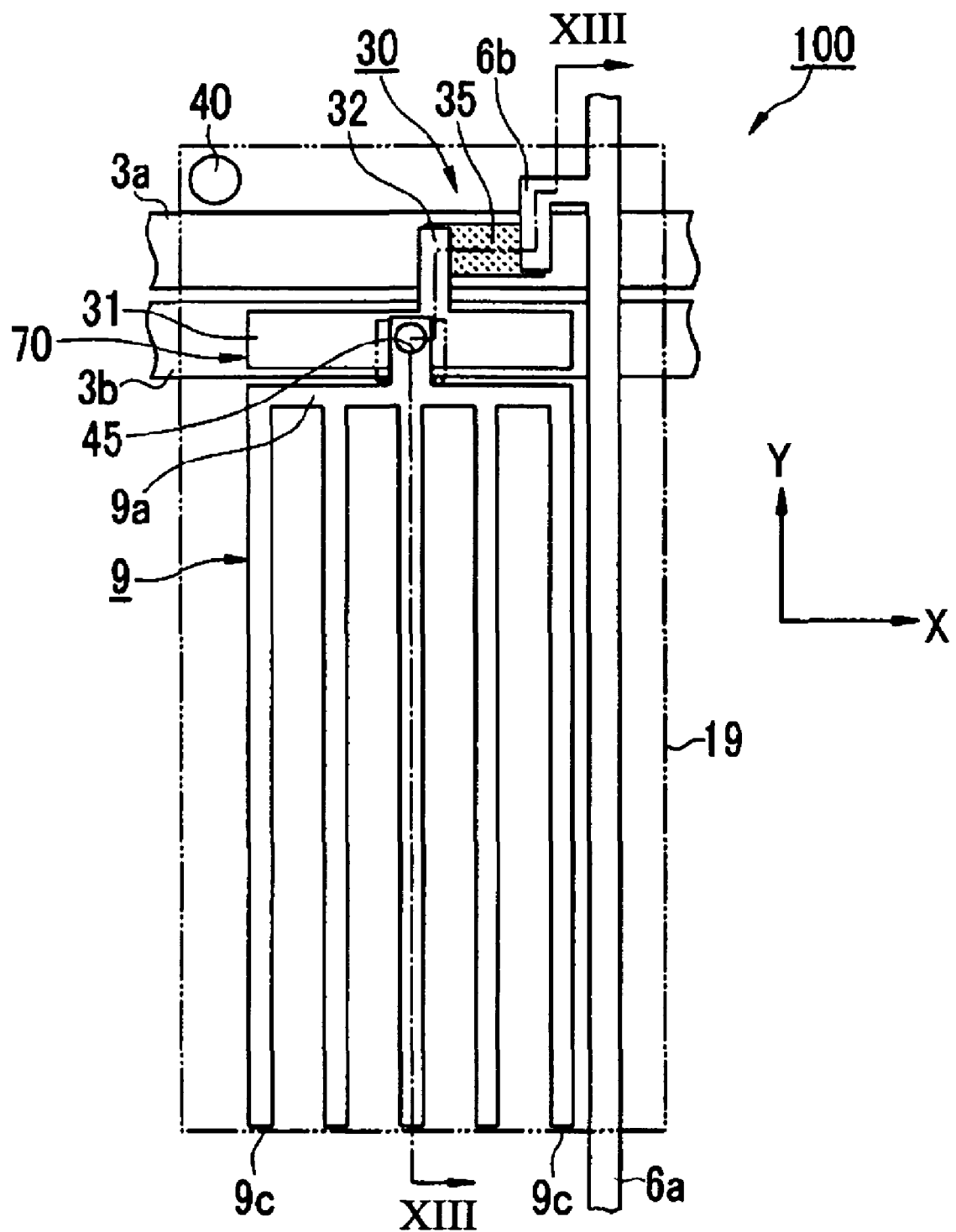
FIG. 12 is a plan view of a subpixel region of the liquid crystal device.
Figure 13:
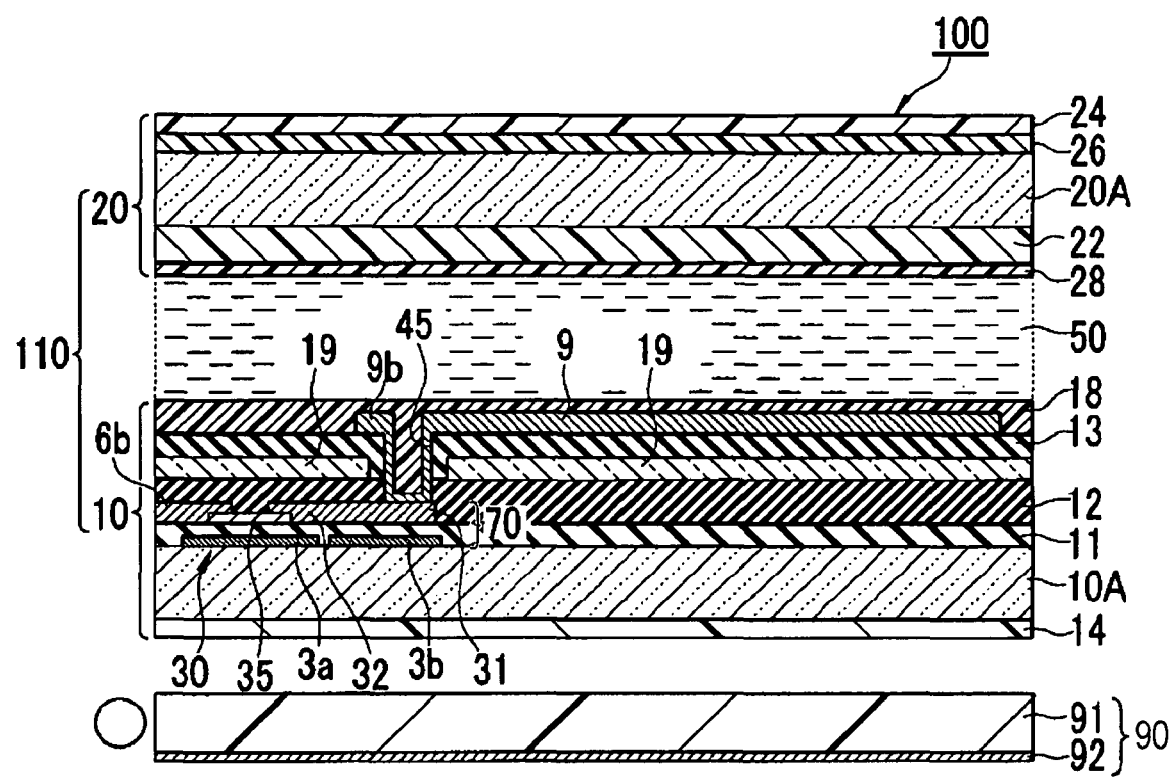
FIG. 13 is a sectional view taken along line XIII-XIII of FIG. 12.

FIG. 11 is a circuit diagram of subpixel regions formed in a matrix in the liquid crystal device 100. FIG. 12 is a plan view of one of the subpixel regions of the liquid crystal device 100. FIG. 13 is a partial sectional view taken along line XIII-XIII of FIG. 12. In the drawings, individual layers and members are illustrated on different scales so as to have visible sizes.

In FIG. 11, the subpixel regions of the liquid crystal device 100 include pixel electrodes 9 and TFTs 30 for switching control thereof. Data lines 6a extending from a data-line drive circuit 101 are electrically connected to sources of the TFTs 30. The data-line drive circuit 101 supplies image signals S1 to Sn to the individual pixels through the data lines 6a. The image signals S1 to Sn may be supplied sequentially or for each group corresponding to the adjacent data lines 6a.

Scanning lines 3a extending from a scanning-line drive circuit 102 are electrically connected to gates of the TFTs 30. The scanning-line drive circuit 102 sequentially supplies scanning signals G1 to Gm in pulse form at predetermined timings to the gates of the TFTs 30 through the scanning lines 3a. The pixel electrodes 9 are electrically connected to drains of the TFTs 30. When the TFTs 30, which serve as switching elements, are turned on for a predetermined period by inputting the scanning signals G1 to Gm, the image signals S1 to Sn are supplied to the pixel electrodes 9 through the data lines 6a at predetermined timings.

The image signals S1 to Sn are supplied at predetermined levels to the liquid crystal through the pixel electrodes 9 and are maintained between the pixel electrodes 9 and a common electrode 19 (see FIG. 12) for a predetermined period. Storage capacitors 70 are disposed in parallel with liquid crystal capacitors defined between the pixel electrodes 9 and the common electrode 19 to prevent leakage of the maintained image signals S1 to Sn. The storage capacitors 70 are disposed between drains of the TFTs 30 and capacitor lines 3b.

Referring to FIG. 13, the liquid crystal panel 110 of the liquid crystal device 100 includes a TFT array substrate (second substrate) 10, a counter substrate (first substrate) 20, and a liquid crystal layer 50 held therebetween. The liquid crystal layer 50 is sealed between the TFT array substrate 10 and the counter substrate 20 with a seal (not shown) provided along the edges of a region where the substrates 10 and 20 face each other. The second polarizer 14 is disposed outside the TFT array substrate 10. The first polarizer 24 is disposed outside the counter substrate 20. The retardation film 26 is disposed between the counter substrate 20 and the first polarizer 24. A backlight (illumination unit) 90 including a light guide plate 91 and a reflector 92 is disposed on the rear side of the TFT array substrate 10 (on the lower side in FIG. 13).

The retardation film 26, which is disposed between the counter substrate 20 and the first polarizer 24 in this example, may also be disposed between the TFT array substrate 10 and the second polarizer 14 with the same optical axis configuration as in the case where the retardation film 26 is disposed between the counter substrate 20 and the first polarizer 24.

Referring to FIG. 12, the pixel electrode 9 (first electrode) in each subpixel region has a substantially comb shape extending in the Y-axis direction in plan view, and the common electrode (second electrode) 19 covers the subpixel region in plan view. A columnar spacer 40 protrudes from the upper left corner of the subpixel region to maintain a predetermined gap between the TFT array substrate 10 and the counter substrate 20.

The pixel electrode 9 includes branched portions 9c extending in the Y-axis direction (five branched portions 9c in FIG. 12) and a base portion 9a connected to ends of the branched portions 9c on the plus side of the Y-axis. The branched portions 9c are arranged in parallel at regular intervals in the X-axis direction.

The common electrode 19 covers the subpixel region shown in FIG. 12 in plan view and is formed of a film of a transparent conductive material such as indium tin oxide (ITO). Light from the backlight 90 passes through the common electrode 19 to enter the liquid crystal layer 50.

In the subpixel region shown in FIG. 12, the data line 6a extends in the Y-axis direction, and the scanning line 3a extends in the X-axis direction. The capacitor line 3b extends along the scanning line 3a. The TFT 30 is disposed near the intersection of the data line 6a and the scanning line 3a. The TFT 30 includes a semiconductor layer 35 disposed at part of the planer region of the scanning line 3a and formed of amorphous silicon, a source electrode 6b overlapping the semiconductor layer 35 in plan view, and a drain electrode 32. The scanning line 3a functions as a gate electrode of the TFT 30 at a position where the scanning line 3a overlaps the semiconductor layer 35 in plan view.

The source electrode 6b of the TFT 30 has a substantially inverted-L shape extending from the data line 6a to the semiconductor layer 35 in plan view. An end of the drain electrode 32 on the minus side of the Y-axis is electrically connected to a capacitor electrode 31 that is substantially rectangular in plan view. The pixel electrode 9 extends to the capacitor electrode 31 in the Y-axis direction. A pixel contact hole 45 is disposed at a position where the pixel electrode 9 overlaps the capacitor electrode 31 in plan view so that they are electrically connect to each other via the pixel contact hole 45. The capacitor electrode 31 is disposed in the planer region of the capacitor line 3b. The capacitor electrode 31 and the capacitor line 3b are disposed opposite each other in the thickness direction to serve as electrodes defining the storage capacitor 70.

In the sectional structure shown in FIG. 13, the TFT array substrate 10 and the counter substrate 20 are disposed opposite each other with the liquid crystal layer 50 held therebetween. The TFT array substrate 10 includes a base 10A formed of a transparent material such as glass, quartz, or plastic. The scanning line 3a and the capacitor line 3b are disposed on an inner surface of the base 10A (facing the liquid crystal layer 50) and are covered with a gate insulating film 11 formed of a transparent insulating material such as silicon oxide.

The semiconductor layer 35 is formed on the gate insulating film 11 by patterning an amorphous silicon film. The source electrode 6b and the drain electrode 32 are disposed so as to partially cover the semiconductor layer 35. The capacitor electrode 31 is formed integrally with the drain electrode 32 on the side facing the pixel contact hole 45. The semiconductor layer 35 faces the scanning line 3a with the gate insulating film 11 disposed therebetween. The scanning line 3a defines the gate electrode of the TFT 30 in a region where the scanning line 3a faces the semiconductor layer 35. The capacitor electrode 31 faces the capacitor line 3b with the gate insulating film 11 disposed therebetween. The gate insulating film 11 serves as a dielectric film of the storage capacitor 70 in a region where the capacitor electrode 31 faces the capacitor line 3b.

A first interlayer insulating film 12 formed of, for example, silicon oxide covers the semiconductor layer 35, the source electrode 6b, the drain electrode 32, and the capacitor electrode 31. The common electrode 19, which is formed of a transparent conductive material such as ITO, covers the first interlayer insulating film 12 in plan view.

A second interlayer insulating film 13 formed of, for example, silicon oxide covers the common electrode 19. The pixel electrode 9 is formed on the second interlayer insulating film 13 by patterning. The pixel electrode 9 is formed of a transparent conductive material such as ITO. The pixel contact hole 45 penetrates the interlayer insulating films 12 and 13 to reach the capacitor electrode 31. The pixel electrode 9 is partially buried in the pixel contact hole 45 and is electrically connected to the capacitor electrode 31. The common electrode 19 has an opening corresponding to a region where the pixel contact hole 45 is formed so as not to come into contact with the pixel electrode 9. An alignment film 18 formed of, for example, polyimide is disposed over the pixel electrode 9 and the second interlayer insulating film 13.

A color filter 22 and an alignment film 28 are disposed on an inner surface of the counter substrate 20 (facing the liquid crystal layer 50). The alignment film 28 is subjected to alignment treatment (for example, rubbing) in a direction parallel to the alignment direction of the alignment film 18 of the TFT array substrate 10. The alignment films 18 and 28 thus initially align liquid crystal molecules of the liquid crystal layer 50 in a direction parallel to the surfaces of the substrates 10 and 20.

The liquid crystal device 100 having the structure described above, which is an FFS-mode liquid crystal device, inputs image signals (voltage) to the pixel electrodes 9 through the TFTs 30 to generate an electric field substantially parallel to the surfaces of the substrates 10 and 20 between the pixel electrodes 9 and the common electrode 19. The liquid crystal is then driven by the action of the electric field to change transmittance for each subpixel, thus displaying an image. As described above, the liquid crystal molecules of the liquid crystal layer 50 are aligned in the alignment treatment direction (rubbing direction) between the substrates 10 and 20 when no voltage is applied to the pixel electrodes 9. The electric field generated between the pixel electrodes 9 and the common electrode 19 acts on the liquid crystal to align the liquid crystal molecules in the width direction of the branched portions 9c of the pixel electrodes 9 shown in FIG. 12. The liquid crystal device 100 provides a contrast display based on birefringence due to the change in the alignment of the liquid crystal. During the operation of the liquid crystal device 100, the common electrode 19 may be maintained at constant voltage to cause a potential difference within a predetermined range between the common electrode 19 and the pixel electrodes 9, or may also be supplied with pulse signals synchronized with the scanning pulses input to the scanning lines 3a.

In this embodiment, the detailed structure of an FFS-mode liquid crystal device has been described as an example of the liquid crystal device 100 according to the first embodiment. Naturally, the liquid crystal devices according to the second to fourth embodiments can be similarly constructed only by changing the configuration of the retardation films 26, 14a, and 24a, and can also be constructed as IPS-mode liquid crystal devices by changing the configuration of the pixel electrodes 9 and the common electrode 19.

Electronic Apparatus

Figure 14A:
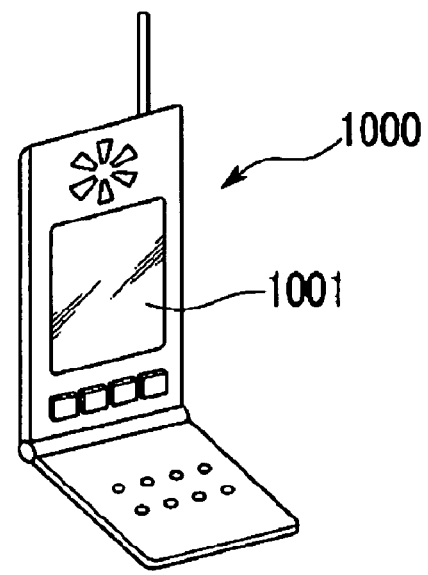
FIGS. 14A to 14C are perspective views of examples of electronic apparatuses according to embodiments of the invention.
Figure 14B:
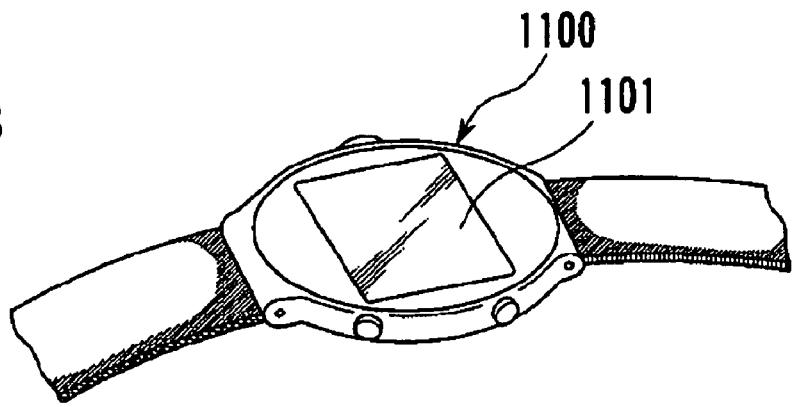
Figure 14C:
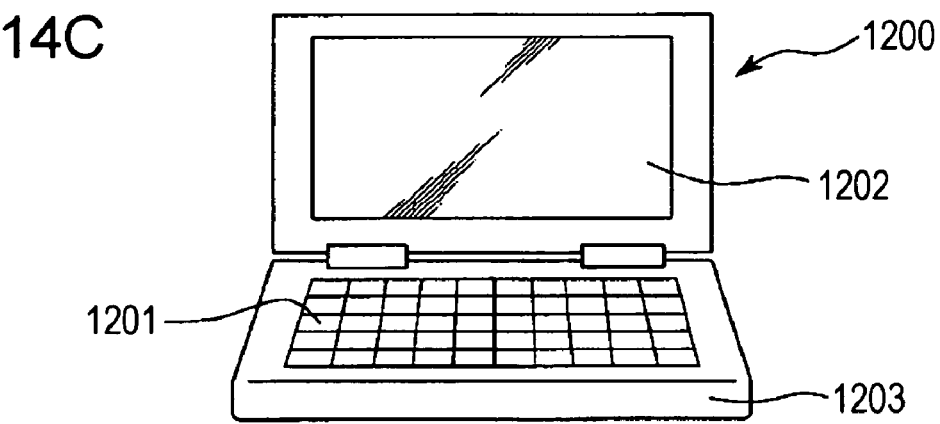

Electronic apparatuses according to embodiments of the invention will be described. These electronic apparatuses include the liquid crystal device according to any of the embodiments described above as a display unit. FIGS. 14A to 14C show examples of such electronic apparatuses.

FIG. 14A is a perspective view of an example of a cellular phone. In FIG. 14A, a cellular phone 1000 includes a display unit 1001 including the liquid crystal device according to any of the embodiments.

FIG. 14B is a perspective view of an example of a wristwatch-type electronic apparatus. In FIG. 14B, a wristwatch-type electronic apparatus 1100 includes a display unit 1101 including the liquid crystal device according to any of the embodiments.

FIG. 14C is a perspective view of an example of a mobile information processor such as a word processor or a personal computer. In FIG. 14C, an information processor 1200 includes an input unit 1201 such as a keyboard, a display unit 1202 including the liquid crystal device according to any of the embodiments, and a main body 1203.

The electronic apparatuses shown in FIGS. 14A to 14C are thinner and less costly and provide a high-contrast display over a wide range of viewing angles because they include the liquid crystal device according to any of the embodiments as a display unit.

The entire disclosure of Japanese Patent Application No. 2006-036084, filed Feb. 14, 2006 is expressly incorporated by reference herein.

What is claimed is:

1. A liquid crystal device comprising:
a liquid crystal panel including a first substrate, a second substrate which has first and second electrodes, and a liquid crystal disposed between the first and second substrates, an electric field generated between the first and second electrodes driving the liquid crystal;
a first polarizer;
a second polarizer, the liquid crystal panel being disposed between the first and the second polarizers; and
a retardation film disposed between the liquid crystal panel and one of the first and the second polarizers;
a sub-pixel region formed in a matrix;
wherein the retardation film has a slow axis which is parallel to the transmission axis of the one of the first and second polarizers, and the liquid crystal initially aligns in a direction parallel to the slow axis of the retardation film,
wherein a point (Nz, Δnd) falls within a range surrounded by points of A1 (0.3, 68), point A2 (0.5, 175), point A3 (0.7, 215), point A4 (0.7, 332), point A5 (0.5, 365), and point A6 (0.3, 230), Δnd (nm) being a phase shift of the retardation film and Nz being the coefficient of the retardation film defined by the following formula (1):

$$Nz=(nx-nz)/|nx-ny| \tag{1}$$

and wherein one of the first and second electrodes forms a pixel electrode, and the other forms a common electrode, the pixel electrode being connected to a TFT element and the common electrode covering the sub-pixel region in plan view.

2. An electronic apparatus comprising the liquid crystal device according to claim 1.

3. The liquid crystal device according to claim 1, further comprising an insulating layer disposed between first and second electrodes.

4. The liquid crystal device according to claim 1, further comprising a display pixel including a plurality of sub-pixel regions, wherein each sub-pixel region includes a reflective display region.

5. The liquid crystal device according to claim 4, wherein the retardation film is disposed on a display side of the liquid crystal panel.

6. A liquid crystal device comprising:
a liquid crystal panel including a first substrate, a second substrate which has first and second electrodes, and a liquid crystal disposed between the first and the second substrates, an electric field generated between the first and second electrodes driving the liquid crystal;
a first polarizer;
a second polarizer, the liquid crystal panel being disposed between the first and the second polarizers;
a first retardation film disposed between the liquid crystal panel and one of the first and the second polarizers;
a second retardation film disposed between the liquid crystal panel and one of the first polarizer; and
a third retardation film disposed between the liquid crystal panel and the second polarizer;
a sub-pixel region formed in a matrix;

wherein the first retardation film has a slow axis which is parallel to the transmission axis of the one of the first and second polarizers, and the liquid crystal initially aligns in a direction parallel to the slow axis of the retardation film, wherein a point (Nz, Δnd) falls within a range surrounded by points of C1 (0, 68), point C2 (0.3, 71), point C3 (0.5, 104), point C4 (0.5, 184), point C5 (0.3, 227), and point C6 (0, 162), Δnd (nm) being a phase shift of the retardation film and Nz being the coefficient of the retardation film defined by the following formula (1):

$$Nz=(nx-nz)/|nx-ny| \tag{1}$$

and wherein one of the first and second electrodes forms a pixel electrode, and the other forms a common electrode, the pixel electrode being connected to a TFT element and the common electrode covering the sub-pixel region in plan view.

7. The liquid crystal device according to claim 6, further comprising an insulating layer disposed between the first and second electrodes.

8. The liquid crystal device according to claim 7, wherein one of the first and the second electrodes forms a pixel electrode, and the other forms a common electrode, the pixel electrode being connected to a TFT element.

9. The liquid crystal device according to claim 6, further comprising a display pixel including a plurality of sub-pixel regions, wherein each sub-pixel region includes a reflective display region.

10. The liquid crystal device according to claim 9, wherein the retardation film is disposed on a display side of the liquid crystal panel.

* * * * *